(12) United States Patent
Baglin et al.

(10) Patent No.: US 12,526,686 B2
(45) Date of Patent: Jan. 13, 2026

(54) SYSTEM AND METHOD FOR MANAGING V2X COMMUNICATION BETWEEN A VEHICLE AND A RECEIVING DEVICE

(71) Applicants: Renault s.a.s., Boulogne-Billancourt (FR); NISSAN MOTOR CO., LTD., Yokohama (JP)

(72) Inventors: Matthieu Baglin, Tournefeuille (FR); Cedric Bondier, Grasse (FR); Eric Perraud, Plaisance du Touch (FR); Stefania Sesia, Roquefort les pins (FR)

(73) Assignees: AMPERE S.A.S., Boulogne-Billancourt (FR); NISSAN MOTOR CO., LTD., Yokohama (JP)

( * ) Notice: Subject to any disclaimer, the term of this patent is extended or adjusted under 35 U.S.C. 154(b) by 568 days.

(21) Appl. No.: 17/607,274

(22) PCT Filed: Apr. 6, 2020

(86) PCT No.: PCT/EP2020/059758
§ 371 (c)(1),
(2) Date: Oct. 28, 2021

(87) PCT Pub. No.: WO2020/221554
PCT Pub. Date: Nov. 5, 2020

(65) Prior Publication Data
US 2022/0210688 A1  Jun. 30, 2022

(30) Foreign Application Priority Data
Apr. 30, 2019 (FR) ...................................... 1904546

(51) Int. Cl.
*H04W 28/02* (2009.01)
*H04W 4/40* (2018.01)
*H04W 76/10* (2018.01)

(52) U.S. Cl.
CPC ......... *H04W 28/0268* (2013.01); *H04W 4/40* (2018.02); *H04W 76/10* (2018.02)

(58) Field of Classification Search
CPC ....... H04L 67/12; H04L 67/125; H04L 67/61; H04W 28/0268; H04W 4/40
See application file for complete search history.

(56) References Cited

U.S. PATENT DOCUMENTS

2018/0279259 A1    9/2018  Gulati et al.
2019/0029002 A1*   1/2019  Kotzer .................... H04L 67/12
(Continued)

FOREIGN PATENT DOCUMENTS

CN  101047981 A  * 10/2007 ............. H04L 47/14
EP  3 454 600 A1     3/2019
(Continued)

OTHER PUBLICATIONS

International Search Report mailed on Jun. 9, 2020 in PCT/EP2020/059758 filed on Apr. 6, 2020 (2 pages).

*Primary Examiner* — Zhensheng Zhang
(74) *Attorney, Agent, or Firm* — Oblon, McClelland, Maier & Neustadt, L.L.P.

(57) ABSTRACT

A piece of mobile vehicle equipment includes a V2X communication management device connected to a cellular communication network. The communication management device includes a Radio Access Technology selection unit that determines the Radio Access Technologies (RAT) available to be used for transmitting a data packet, associated with a V2X application executed by the piece of mobile vehicle equipment, to at least one receiving device. The selection unit selects the available Radio Access Technologies from a set of Radio Access Technologies, depending on target Quality of Service information including an n-tuple of performance indicators, the n-tuple of performance indicators including at least one performance indicator and being (Continued)

determined from a set of performance indicators chosen according to the V2X application.

17 Claims, 9 Drawing Sheets

(56) References Cited

U.S. PATENT DOCUMENTS

| 2019/0104530 | A1 | | 4/2019 | Deng | |
|---|---|---|---|---|---|
| 2020/0045568 | A1 | * | 2/2020 | Kwon | ............... H04W 4/40 |
| 2020/0107212 | A1 | * | 4/2020 | Zielinski | ............ H04W 4/46 |

FOREIGN PATENT DOCUMENTS

| TW | 201349897 A | * | 12/2013 | ........ H04W 72/1215 |
|---|---|---|---|---|
| WO | WO-2017168112 A1 | * | 10/2017 | ............... H04L 5/14 |
| WO | WO 2018/089616 A1 | | 5/2018 | |

* cited by examiner

SYSTEM AND METHOD FOR MANAGING V2X COMMUNICATION BETWEEN A VEHICLE AND A RECEIVING DEVICE

TECHNICAL FIELD

The invention generally relates to wireless communication systems and in particular to a device and to a method for managing V2X communication between a vehicle and one or more receiver devices.

The technologies for communicating between vehicles have experienced significant advances in recent years by virtue of the emergence of Intelligent Transport Systems (ITS) implemented between connected vehicles for improving the safety and the efficiency of road circulation. ITS systems are based on broadcasting messages, using V2X radio access technologies comprising technologies for communicating between 'Vehicles' ("Vehicle To Vehicle" (V2V), between 'Vehicles and Infrastructures' (V2I) and between 'Vehicles and Pedestrians' (V2P). Such messages are generally used to determine an action to be implemented in a real-time situation such as, for example, a warning action if a collision risk is detected or an emergency stop action if a danger is detected, with the action generally having to be implemented quickly.

The automobile applications can send their V2X (V2V, V2I and V2P) messages by different means. V2X messages can be sent, for example, by means of 'direct' V2V communications based, for example, on the 802.11p standards, on PC5 radio technology or even on a 5G link. Such 'direct' V2V communications are also called short-range or ad hoc technologies.

Alternatively, V2X messages can be sent by means of 'indirect' (V2N2V) communications using 4G or 5G connectivity (via the air interface, also called Uu interface, for the LTE and 5G networks). In the case of indirect V2N2V communications, an offboard server in the network hosts a service that processes the data and makes them available for the user. The required connectivity performance capabilities are generally different as a function of the user situation, for example, in terms of latency, reliability, and/or flow. In other situations, the availability of service can also play a significant role. However, no solution exists for dynamically determining the most suitable radio access technology to be applied as a function of the target performance capabilities.

In patent application CN106658351, a solution is proposed for determining a strategy for transmitting over a downlink for a 4G base station. In particular, this solution allows the type of link (broadcasting, multi-broadcasting, mono-broadcasting) to be used to be determined and the target node eNB to be selected and allows received V2X data to be transmitted according to the type of V2X service. However, this solution does not allow the radio access technology RAT to be selected that is the most suitable in terms of the target Quality of Service of the V2X messages.

In another approach, which is described in application WO 2001/705531, selecting an LTE network or Road Side Units (RSU) is proposed for V2X base stations for certain types of V2X messages. This solution shifts some of the V2X processing to the RSUs for optimized load distribution between the cellular and V2X networks. However, the selection is carried out from the LTE base stations and not from the part placed on board the vehicle. Furthermore, this solution does not allow the RAT technology to be determined that is to be applied per message that allows the target performance capabilities to be achieved in the best possible manner.

Therefore, a requirement exists for an improved system and method for dynamically determining the optimal Radio Access Technology to be applied for sending a V2X message as a function of target performance capabilities.

General Definition of the Invention

The invention will improve the situation. To this end, it proposes a piece of mobile vehicle equipment comprising a V2X communication management device connected to a cellular communication network. Advantageously, the communication management device comprises a Radio Access Technology selection unit configured to determine at least one Radio Access Technology (RAT) that is available to be used for transmitting a data packet, which is associated with a V2X application executed by the piece of mobile vehicle equipment, to at least one receiver device. The selection unit is configured to select at least one Radio Access Technology that is available from a set of Radio Access Technologies, as a function of target Quality of Service information comprising an n-tuple of performance indicators, the n-tuple of performance indicators comprising at least one performance indicator and being determined from a set of performance indicators selected as a function of the V2X application.

In one embodiment, the performance indicators of the set of performance indicators can be selected from a group comprising at least one latency parameter, one reliability parameter, one availability parameter, one data flow parameter and one information age parameter.

The communication management device can comprise a connection unit configured to establish an initial connection with an application server providing the V2X service associated with the V2X application, via a cellular network, the connection unit being configured to send a request to subscribe to the V2X application to the application server, the subscription request identifying the V2X service and comprising Quality of Service information required by the piece of mobile vehicle equipment, the Quality of Service information comprising the target Quality of Service.

In particular, the piece of mobile vehicle equipment can be configured to receive a notification of the opening of a bearer for conveying information between the application server and the piece of mobile vehicle equipment if a Quality of Service estimated over a future time period meets one or more conditions relating to the Quality of Service information.

The Quality of Service information can further comprise an acceptable degraded range of Quality of Service values.

The subscription request can further comprise a description of a Region of Interest associated with the V2X application, the description being a relative description relative to the position of the piece of vehicle equipment or an absolute description defined in an absolute reference frame.

In particular, the absolute description can be represented in the absolute reference frame on the basis of vectors and/or of polygons and/or of tiles.

The subscription request can further comprise types of information and attributes, with each attribute being associated with a given type of information.

In one embodiment, the communication management device can comprise a unit for estimating V2X service availability, the unit for estimating service availability being capable of estimating the availability of a V2X service on the basis of information for predicting the Quality of Service QoS.

The piece of mobile vehicle equipment can further comprise a unit for determining availability that is configured to compute a vector of availability of RATs, on the basis of the comparison between the target Quality of Service and a predicted Quality of Service over a future time window, the availability vector comprising a set of components having a binary value, each component being associated with an RAT that can be used to transmit the data packet from the piece of mobile vehicle equipment, with the binary value indicating the availability or the unavailability of the RAT.

In one embodiment, the piece of mobile vehicle equipment can further comprise an RAT selector that is configured to select at least one RAT from among the RATs of the vector of availability of RATs as a function of a set of transmission criteria.

In particular, the transmission criteria can comprise a criterion relating to a redundancy parameter and/or a V2X cost of service parameter and/or a message priority parameter and/or a V2X service parameter.

A V2X communication system is also proposed comprising at least one piece of vehicle equipment according to one of the preceding features, a cellular communication network and an application server delivering the V2X service associated with the V2X application, the system comprising a prediction function capable of predicting the Quality of Service on the basis of the target Quality of Service information.

A method is also proposed for transmitting a data packet associated with a V2X application of a piece of mobile vehicle equipment executing the V2X application to at least one receiver device, the piece of mobile vehicle equipment being connected to a cellular communication network. Advantageously, the method comprises a selection step involving selecting at least one Radio Access Technology that is available to be used for transmitting the data packet, on the basis of a set of Radio Access Technologies, as a function of target Quality of Service information comprising an n-tuple of performance indicators, said n-tuple of performance indicators comprising at least one performance indicator and being determined from a set of performance indicators selected as a function of the V2X application.

The embodiments of the invention thus allow the quality of a radio access technology to be controlled and predicted so as to anticipate changes and to adapt the on-board behavior.

The embodiments of the invention also allow the availability of the radio access technologies to be controlled on the basis of the Quality of Service and the optimal radio access technologies to be selected that are to be applied for transmitting a V2X message.

BRIEF DESCRIPTION OF THE DRAWINGS

Further features and advantages of the invention will become apparent from the following description and from the accompanying drawings, in which.

The detailed description is also supplemented by appendix A1. This appendix is provided separately for the sake of clarification and to facilitate cross-referencing. The appendix forms an integral part of the description and therefore not only can be used to better understand the present invention, but also to contribute to its definition, where appropriate. This also applies in every respect to the drawings.

DETAILED DESCRIPTION OF THE APPLICATION

Figure 1:
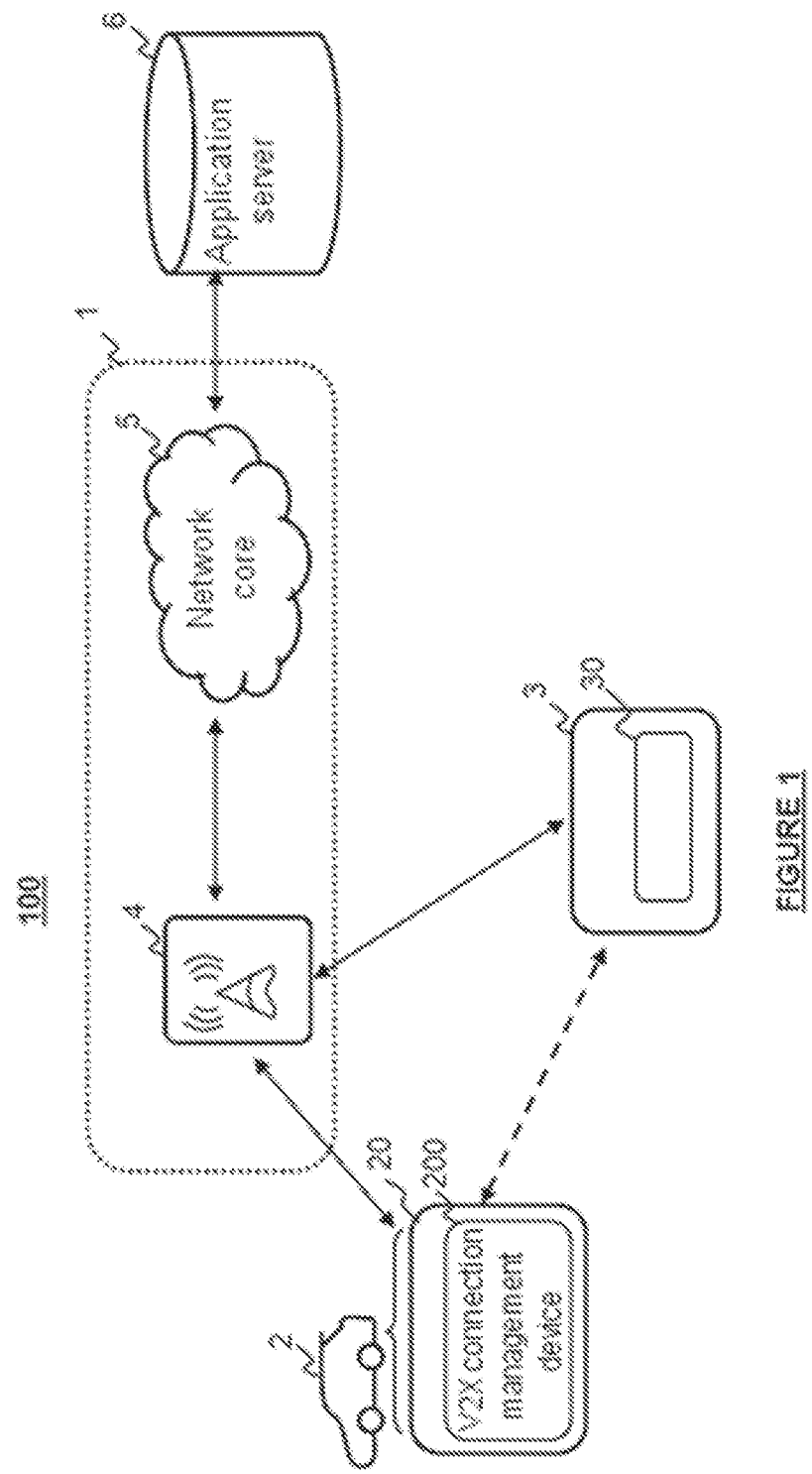
FIG. 1 is a drawing showing an example of the operational environment in which the communication management system can be implemented, according to embodiments of the invention.

FIG. 1 shows an example of a V2X communication infrastructure 100, according to embodiments of the invention.

The embodiments of the invention provide a device and a method for managing V2X communication between a piece of mobile vehicle equipment 2 (also called 'vehicle' or 'transmitter vehicle' hereafter) and at least one receiver device 3 capable of dynamically determining one or more radio access technologies RAT available to be used for transmitting data from the piece of mobile vehicle equipment 2 to the one or more receiver devices 3, as a function of at least one target performance indicator.

The environment 100 forms an intelligent transport architecture (ITS) that is configured to manage the security and the efficiency of the road traffic using wireless V2X communications between a connected vehicle 2 and receiver device 3.

Each vehicle 2 can be equipped with a communication device 20 configured to allow relative communication with one or more V2X applications:

between the vehicle 2 and an application server 6 distributing the V2X service to the receiver devices 3 via a cellular communication network 1; or an exchange of data packets relating to one or more V2X applications between the vehicle 2 and receiver devices 3 located in an area within range, by means of one or more Ad hoc Radio Access Technologies, with the area within range corresponding to the shortest range of the Ad hoc radio technologies.

More generally, a V2X communication can be used in applications for optimizing road efficiency, for managing road traffic, for reducing victims and for improving road safety, for autonomous vehicles.

The vehicle can be equipped with wireless communication means (transmission and reception) adapted for communication with the cellular network 1 and for the RAT based communication with the receiver devices 3 located in the vicinity. The receiver devices 3 also implement one or more corresponding V2X applications and a communication device 30 capable of communicating with the communication device 20 of the vehicle 2.

The vehicle 2 also can be equipped with a set of sensors configured to measure environmental parameters and/or with at least one camera configured to record sequences of images of the environment of the vehicle. The data from the sensors and/or from the cameras can be used by the communication device 20.

A V2X communication can be used so that vehicles 2 can use intelligent services by sharing the environmental information acquired by the vehicles, the road infrastructures or pedestrians equipped with a mobile device by virtue of vehicles or sensor equipment located in the vicinity.

A V2X communication uses a piece of transmitter or receiver vehicle equipment, such as the vehicle 2, implementing a V2X application via a 3GPP compliant data transfer. Depending on the type of receiver devices 3, the V2X communication can be a V2V, V2I or V2N communication. In a V2V communication, the communication occurs between two vehicles 2 and 3 that use a V2V application. In a V2I communication, a vehicle 2 and a road infrastructure 3 (also called Road Side Unit (RSU)) use a V2I application. A road infrastructure 3 supports a V2I service configured to send and/or receive data to/from the vehicle 2 using the V2I application. A road infrastructure 3 can be implemented in a base station or a piece of stationary vehicle equipment. In a V2N communication, the V2N communication is between a vehicle 2 and a V2X application server (such as the server 7).

According to the embodiments of the invention, the communication device comprises a communication management device 200 configured to dynamically determine the one or more available radio access technologies likely to be used for transmitting a V2X data packet to the detected receiver devices 3, as a function of a set of target performance indicators comprising at least one performance indicator.

As used, a Radio Access Technology (RAT) refers to the underlying physical connection method for a radio communication network, such as, for example, and in a non-limiting manner:

a third generation RAT (3G);
a fourth generation RAT (4G, LTE);
a fifth generation RAT (5G);
an 11p type Ad hoc communication;
a PC5 type Ad hoc communication.

More generally, in this case an RAT denotes any current or future generation Radio Access Technology.

The execution of the V2X application by the vehicle 2 can use a cellular communication network 1 comprising at least one base station 4, one cellular network core 5, and an application server (AS) 6 is used. The communication network allows the vehicle 2 to access the V2X service corresponding to the V2X application and to communicate V2X messages (in the form of V2X data packets) with the receiver devices 3. A receiver device 3 denotes any device provided with communication means for receiving the V2X data packets transmitted by the transmitter vehicle 2.

The base stations 4 can be equipped with V2X communication functions for supporting the V2X communication.

The application server 6 can be any type of offboard server on the network (for example, a 'cloud' server or distributed server) implementing data processing functions configured to send the information required by the vehicle.

The cellular communication network can be, for example, an LTE network, the base stations 4 being eNB nodes of the LTE network.

In the embodiments where the receiver device 3 is a vehicle, the receiver device 3 can receive data directly from the transmitter vehicle 2 or from the application server 6 by means of base stations 4 and of the network core 5.

The vehicle 2 can use the V2X application server to relay, multi-broadcast or broadcast road traffic information or safety information or information from road applications to the receiver devices 3 located in a zone of proximity and executing a corresponding V2X application. For example, the vehicle 2 can simultaneously broadcast a V2V message (for example, at the same time) to several other vehicles 3 located in the vicinity or can transmit a V2I message to a single road infrastructure 3 or broadcast a V2P message to all the pedestrian devices equipped with a mobile device 3 that are located in the vicinity.

In order to send a V2X data packet to receiver devices 3, the vehicle 2 can transmit a V2X subscription request to the application server 6 through at least one base station 4, when the vehicle is within the area of coverage of the one or more base stations 4, with the request comprising application layer information, such as location or attributes of service information.

The base station 4 serving the vehicle 2 transmits the subscription request to the network core 5. The network core 5 can be configured to read this request, register a piece of mobile vehicle equipment 2 in response to a V2X subscription request, locate the piece of mobile vehicle equipment 2, authenticate the piece of mobile vehicle equipment 2, and/or manage the Quality of Service of the connection between the vehicle 2 and the application server 6 as a function of the type of subscription.

In another embodiment, the vehicle 2 can negotiate with the network core 5 with respect to the Quality of Service of the connection between the vehicle 2 and the application server 6 as a function of the type of subscription, independently of the subscription method per se. As an alternative embodiment, the V2X service hosted in the application server 6 can negotiate with the network core 5 with respect to the Quality of Service of the connection between the vehicle 2 and the application server 6 as a function of the type of subscription, independently of the subscription method. In another alternative embodiment, the network core 5 can establish, while the vehicle is registered in the cellular network core, connectivities with a default Quality of Service, with each Quality of Service level having been provided (allocated) by the operator as a function of the subscription of the vehicle therewith.

The vehicle 2 can reach the network core 5 by using one or more access technologies, such as an access technology compliant with the 3GPP specification, such as, for example, E-UTRAN (in LTE and LTE-Advanced), or UTRAN, or not compliant with 3GPP, such as WiMAX, or WLAN.

The cellular communication network 1 is used to relay and to provide data between the vehicle 2 and the external application server 6, which provides the V2X service.

The subscription request can comprise information relating to the target Quality of Service required by the vehicle 2. The Quality of Service is made up of an n-tuple of performance indicators, depending on the executed V2X application.

In one embodiment, the performance indicators (denoted KPIs) of the n-tuple can comprise one or more indicators from among:

one or more latency related parameters (such as the maximum latency or the average latency);
one or more reliability parameters (such as the maximum or average message loss rate);
an availability parameter;
a data flow parameter (such as the maximum flow); and/or
an information age parameter.

The maximum latency denotes the maximum transfer time of a V2X data item from the vehicle 2 (transmitter vehicle) to the application server 6 or from the application server 6 to the receiver device 3.

The average latency denotes the average transfer time of a V2X data item from the vehicle 2 (transmitter vehicle) to the application server 6 or from the application server 6 to the receiver device 3.

The maximum message loss rate denotes the maximum percentage of V2X packets lost between the vehicle 2 (transmitter vehicle) and the application server 6 or between the application server 6 and the receiver device 3.

The maximum flow denotes the flow negotiated between the vehicle 2 (transmitter vehicle) and the application server 6 for the target latency and message loss rate.

The embodiments of the invention also allow dynamic determination of the RATs that are available to be used in the V2X communication between a vehicle 2 and a receiver device 3, which guarantee optimal performance indicators KPIs in relation to the target performance capabilities defined as a function of the V2X application executed by the vehicle 2 (for example, V2X emergency braking message, V2X traffic jam message, remote driving, etc.).

The embodiments of the invention allow real-time or near real-time dynamic determination of the one or more radio access technologies RATs that are available that guarantee optimal performance indicators in relation to the target performance indicators defined for the V2X application executed by the transmitter vehicle 2. Thus, the routing of the information relating to the V2X application, the content of the message sent by the transmitter vehicle 2 to the receiver devices 3 using the selected available radio access technologies, are implemented so as to dynamically optimize the use of the radio resources. For example, for a V2X application associated with the performance indicators associated with the load of the network, the V2X communication management device 200 can dynamically determine the available RATs and select those that allow the load of the network to be reduced.

Figure 2:
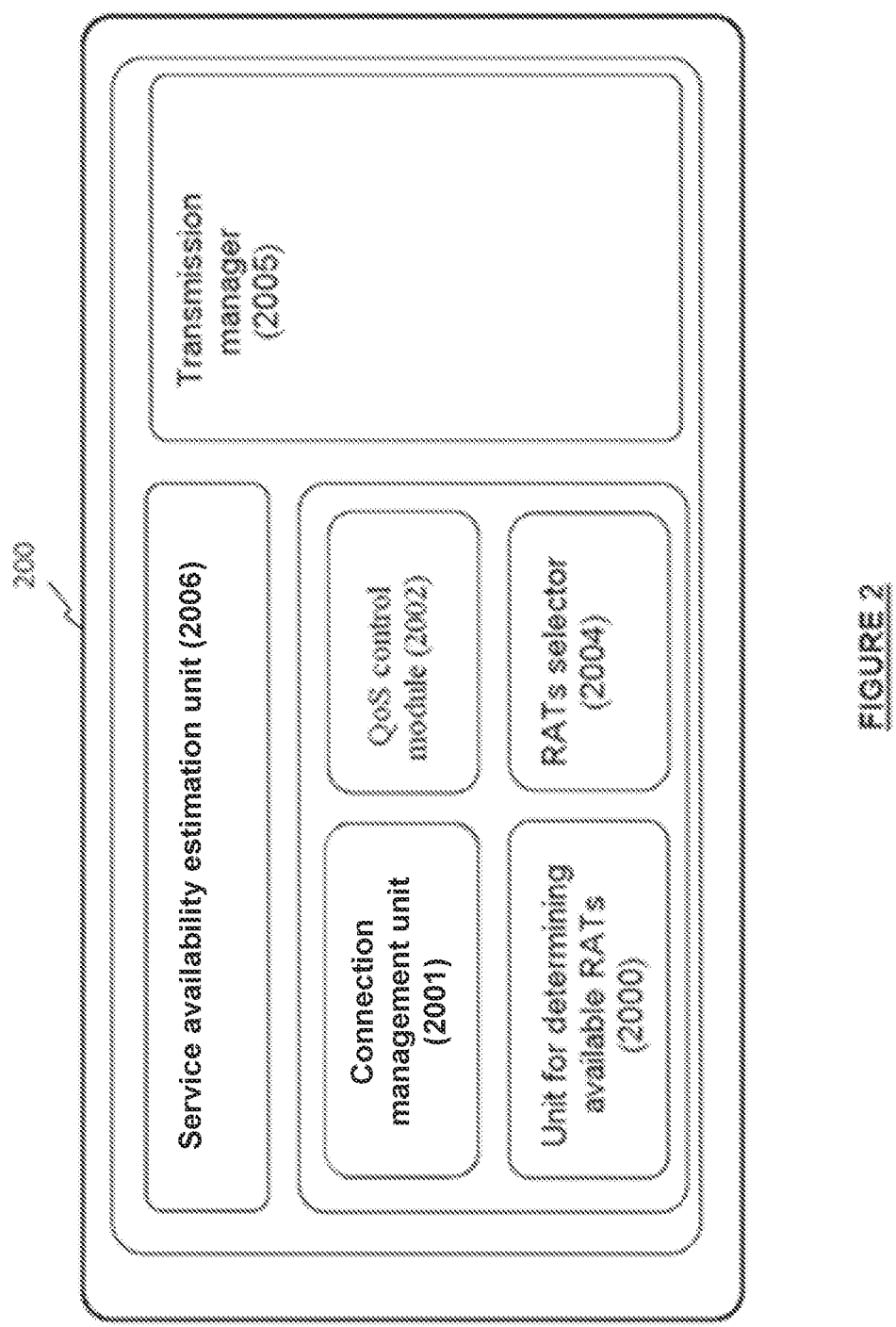
FIG. 2 is a diagram showing the communication management system according to some embodiments.

FIG. 2 is a diagram showing the communication management device 200 on board the vehicle 2, according to some embodiments.

As illustrated in FIG. 2, the V2X communication management device 200 can comprise a connection management unit 2001 configured to establish a connection with the application server 6 via the one or more base stations 4 that serve the vehicle and the core network 5, according to a registration and subscription method. The connection management unit 2001 allows communication to be established with the offboard application server 6 on the network, allows the piece of vehicle equipment 2 to be registered and/or allows subscription to the V2X service. The subscription allows the vehicle 2 to notify the offboard application server 6 of its requirements.

In one embodiment, the connection management unit 2001 is configured to send a request to register with the V2X communication service, corresponding to the V2X application, to the application server 6. The registration request can comprise:
- a Region of Interest (ROI) representing the target zone to be detected for implementing the V2X service corresponding to the V2X application executed by the vehicle 2, the Region of Interest can be detected by the vehicle during the execution of the V2X application using one or more sensors and/or signaling means equipping the vehicle; the Region of Interest can be represented by a set of ROI parameters characterizing the Region of Interest;
- attributes of V2X services indicate the type of information required by the vehicle 2; and
- a target Quality of Service $QoS^{target}$ ($KPI_1^{target}$, ..., $KPI_j^{target}$, ..., $KPI_n^{target}$) defined by an n-tuple comprising n target values defined for n Performance Indicators $KPI_j^{target}$ (with n being an integer at least equal to 1) associated with the V2X application executed by the vehicle, such as the reliability, latency, etc.

The V2X communication management device 200 further comprises a unit 2000 (also called "availability unit") for selecting available Radio Access Technologies (RATs) configured to determine a list of available RATs to be used for transmitting a V2X message relating to a V2X application executed by the vehicle 2 to the receiver devices 3.

The V2X communication management device 200 can further comprise a QoS control module 2002 configured to analyze the current value of each of the n performance indicators, during the execution of the V2X application, for each of the P RAT technologies. The control module 2002 can comprise one or more storage structures (not shown) for storing the current value of each of the n performance indicators, for example, in the form of a matrix P*n (P times n).

As an alternative embodiment, the control module 2002 for the n Performance Indicators can store predicted values of the n performance indicators, with each predicted value being associated with a future time window corresponding to the validity period of the predicted value. The prediction of the KPI value can be carried out by a prediction function implemented in the environment 100, for example, in the cellular network 1 (for example, in the network core 5) or in the vehicle 2 or in the application server 6. The remainder of the description will be provided with reference to predicted KPI values, by way of an illustrative example.

The unit for selecting RATs can be activated by the vehicle 2 when a V2X message needs to be sent to the receiver devices 3, for example, in response to the detection of conditions for sending V2X messages (as a function of detected events) by the vehicle 2.

The unit 2000 for determining available RATs can then determine all the available RATs from among the RATs of the n-tuples on the basis of the predicted values of each of the n performance indicators maintained by the control module 2002 and of an estimated time $\tau_j$ associated with the current value of each performance indicator.

The unit 2000 for determining available RATs can comprise a comparator configured to compare, for each RAT, the predicted values of the n performance indicators $QoS_j =$ ($KPI_{1,j}$, ..., $KPI_{j,j}$, ..., $KPI_{n,j}$) of each RAT of a set of P RATs (with j≤P) held by the control module 2002, with the target values of the n performance indicators KPI defined by the application $QoS^{target}$ ($KPI_1^{target}$, ..., $KPI_j^{target}$, ..., $KPI_n^{target}$). The unit 2000 for determining available RATs is also configured to determine an availability bit representing the availability of the RAT as a function of the result of the comparison, using a time estimator configured to estimate, for the considered RAT, an availability time $\tau_k$ representing the time during which the k-th RAT is considered to be available or unavailable. In one embodiment, the time estimator can be configured to only estimate the availability time of an RAT, if the comparator determines that the RAT is available. Even though the comparator and the time estimator are shown in the unit 2000 for determining available RATs, a person skilled in the art will easily understand that the comparator and the time estimator can be arranged in other elements of the communication management device 20, outside the selection unit 200.

In another embodiment, the selection unit 200 can be configured to compare the vectors $QoS_j$ (with $j \leq P$) to the targeted QoS values, by message class ($QoS^{target}$ for the 'Decentralized Event' type V2X messages and $QoS^{target}$ for the MCM or 'Maneuver Collaboration Message' type V2X messages), instead of comparing them to the targeted QoS values per application.

The unit 2000 for determining available RATs can be configured to compute a vector V of available RATs comprising P components, with each component being associated with an RAT from among the P RATs, each k-th component corresponding to the availability bit determined for the k-th RAT and being able to have a first value (for example, 1) indicating the availability of the RAT or a second value (for example, 0) indicating the unavailability of the RAT. The remainder of the description will be provided with reference to the use of such an availability vector $V_i$ by way of a non-limiting example. In one embodiment, the vector $V_i$ can be specific to each application "i" or to each class of messages "i". The vector $V_i$ can be semi-static. As used in this case, a 'semi-static' vector $V_i$ denotes a vector that changes little over time, i.e. as long as no change in the performance indicators is detected or reported.

The selection unit 200 can further comprise a selector 2004 configured to select an RAT of the vector $V_i$ on the basis of selection criteria comprising at least one criterion from among a redundancy criterion, a V2X cost of service criterion, a message priority criterion, and/or a service criterion. The selector 2004 thus provides an availability sub-vector V' that thus comprises a sub-set of the components of the availability vector V, each component of the vector V' being associated with an RAT and having the value that is associated therewith in the availability vector V, with the other components of the availability vector V having been removed.

The unit 2000 for determining available RATs and the control module 2002 form a control plan allowing the V2X communication to be established.

The communication management module 200 can further comprise a transmission manager 2005 configured to select the RATs of the sub-vector $V_i'$ associated with an availability bit with the first binary value (for example, '1'), which indicates the availability of the corresponding RAT and adds information relating to the available RATs selected for the payload of the data packet to be transmitted to the receiver devices 3, for example, as a header of the data packet (transmission data plan) or in a metadata, to allow the message to be routed to the RATs selected by software layers.

The communication management device 200 can be used for dynamic routing of V2X data by matching the data packet to be sent to the receiver devices 3 with the available RATs selected by taking into account radio conditions.

In another example of an application, the communication management device 200 can be used for routing semi-static data by matching the data packet to be sent from the vehicle 2 to the receiver devices 3 with the available RATs selected as a function of the traffic classes of messages by taking into account information such as priority information and content.

As used herein, 'traffic classes' (also called 'classes of packets') refer to categories of messages grouped as a function of similarity criteria or of targeted KPIs. The traffic classes correspond to network classifications representing Quality of Service requirements in the network.

The embodiments of the invention allow selection and deselection of a long-range communication link Uu as a function of the message to be sent.

The interface Uu represents the interface between the piece of vehicle equipment 2 and a base station 4 (air interface for long-range connectivity). It should be noted that even though the description refers to the interface Uu of the LTE network, the invention is not limited to LTE connectivity and is applicable to other types of connectivity, such as 5G connectivity or future centralized communication links.

Even though it is not limited to such uses, the invention has particular advantages in the field of autonomous vehicle applications. An autonomous vehicle actually uses a communication architecture for executing autonomous vehicle applications implemented in different systems (for example, ADAS, GPS, etc.). The communication management device according to the invention allows the communication with the network to be dynamically adapted as a function of the various system requirements of the autonomous vehicle.

In one embodiment, the communication management device 200 can further comprise a unit 2006 for estimating the availability of V2X services that is configured to estimate the availability of a V2X service on the basis of predicted Quality of Service information or of Quality of Service values negotiated with the application server 6, with the Quality of Service (QoS) being defined as a sub-set of quality indicators. The vehicle 2 can then activate or deactivate V2X services corresponding to V2X applications placed on board the vehicle 2 as a function of the service availability information of the vehicle.

The embodiments of the invention allow the transmitter vehicle 2 to obtain an estimate (prediction) of the Quality of Service and of the future availability of the usable RATs, in a future time window (such as, for example, in the next minutes or seconds), in order to estimate the availability of RATs. In one embodiment, the communication management device can assign priorities to the V2X services as a function of the received estimates. Advantageously, the Quality of Service is controlled by the control module 2002 on-board the vehicle 2 and not in the application server 6, which is offboard in the network. The KPIs for estimating the availability of the cellular RAT can use the QoS notifications of the created connections, when the vehicle connects to the offboard service, or an over-estimate (prediction) of the Quality of Service and of the future availability of the cellular RAT (in a future time window such as, for example, in the next minutes or seconds).

Figure 3:
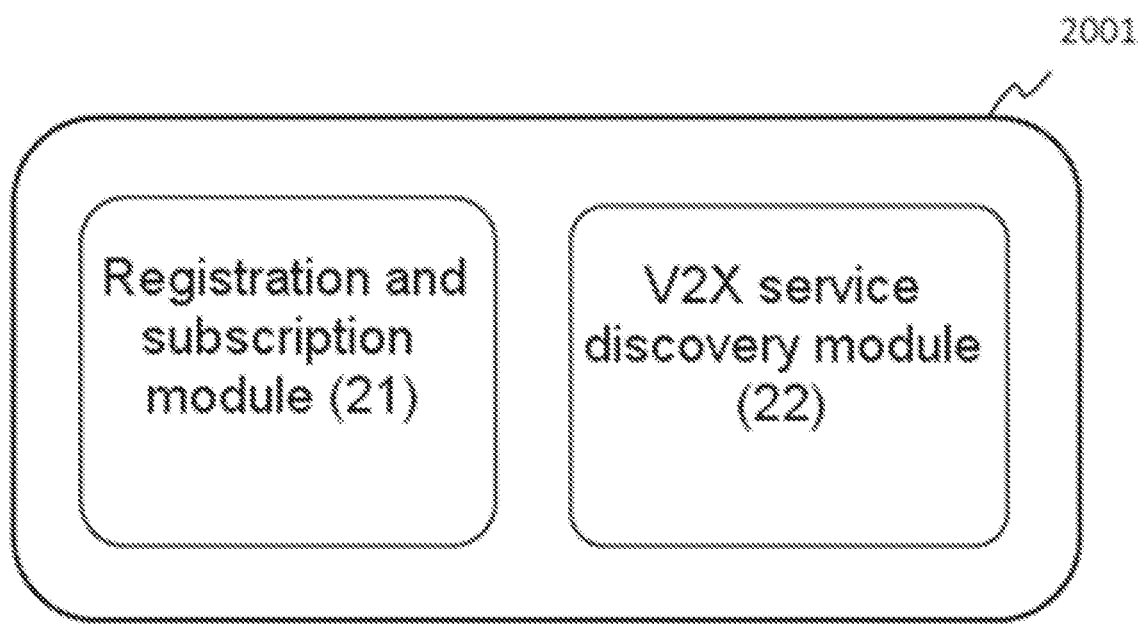
FIG. 3 is a diagram showing the connection management unit according to one embodiment.

FIG. 3 shows an example of the implementation of the communication management device 20, according to one embodiment.

As shown in FIG. 3, the connection management unit 2001 can comprise:
 a registration and subscription module 21 configured to establish the connection between the vehicle 2 and the application server 6, independently of the location of the application server 6; and
 a module for discovering geographical service (geoservice) 22, representing a web-based service with geographical components that can be hosted by the application server 6.

The geoservice discovery module 22 can be configured to exchange authentication information (identifiers) with a geoserver (which can be integrated in the application server 6) associated with the geoservice, for example, by using an http message, in order to obtain the list of services supported by the geoserver.

In one embodiment, the list of services supported by the geoserver can be exchanged by means of a service management function included in the network.

Figure 4:
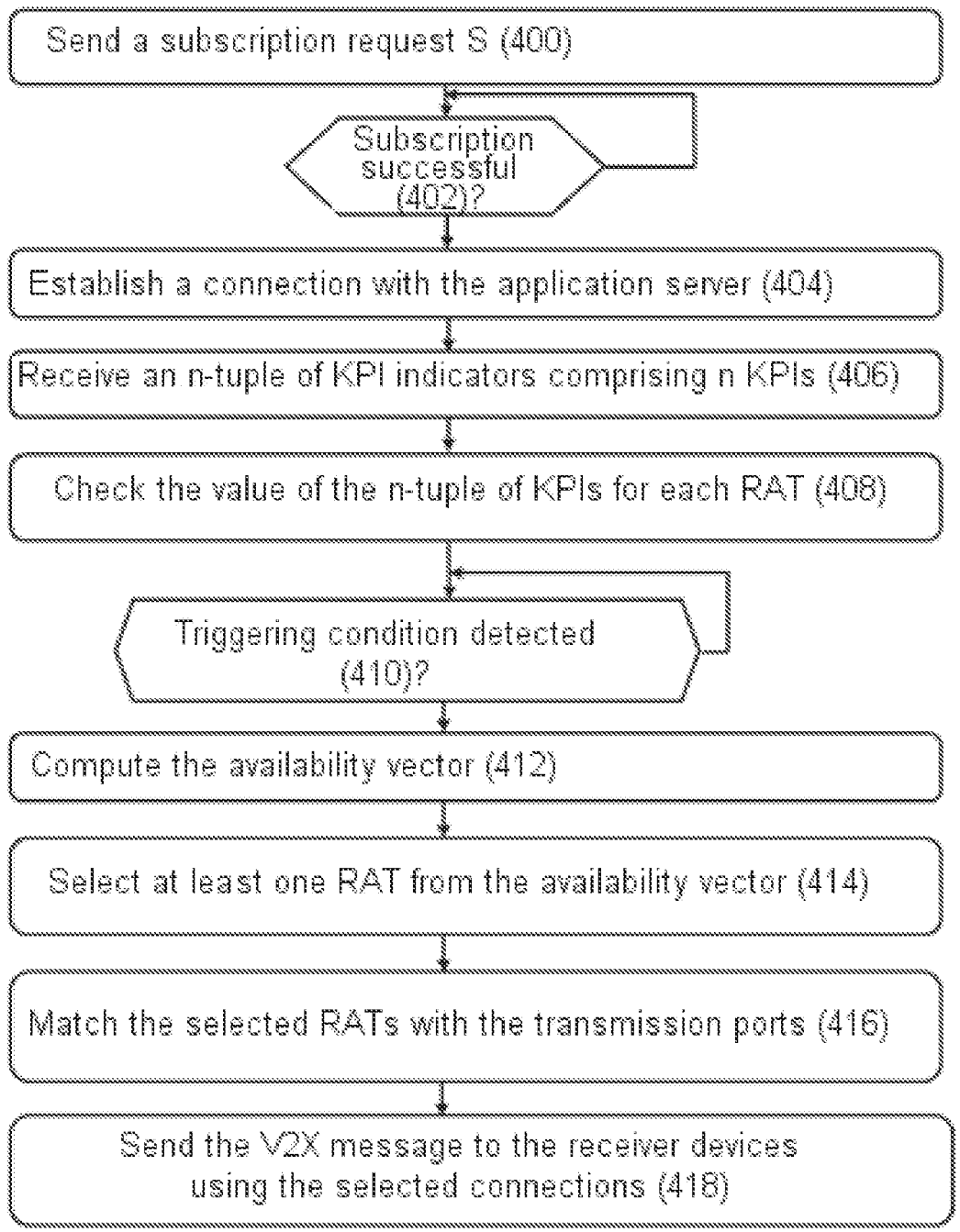
FIG. 4 is a flowchart showing a method for managing communication between a motor vehicle and a receiver device, according to some embodiments.

FIG. 4 is a flowchart showing the communication management method, according to some embodiments.

In step 400, a V2X subscription request is sent by the vehicle 2 to the application server 6 via the base station 4 and the network core 5.

In step 404, if the subscription is successful (step 402), a connection is established between the vehicle 2 and the application server 6.

In step 406, an n-tuple of target performance indicators KPIs is received by the vehicle 2.

In step 408, the value of the n-tuple of performance indicators is controlled for each RAT from among a set of predefined RATs.

In step 412, if a condition for triggering the sending of a V2X message is detected (410), the available RATs from among the RATs controlled in step 408 are selected from the current value of the n-tuple of performance indicators. The selected available RATs can be returned in the form of an availability vector. The selected available RATs are those that are associated with the optimal performance indicators KPIs in relation to the target performance capabilities defined for the V2X application.

In step 414, at least one RAT is selected from among the available RATs of the availability vector as a function of one or more selection criteria (or metrics), such as redundancy, the cost of V2X service, the V2X message priority, etc.

In step 416, the RATs selected in step 414 are matched with the message transmission ports.

In step 418, the V2X message is sent to the receiver devices 3 capable of receiving the V2X message transmitted by the vehicle 2.

Figure 5:
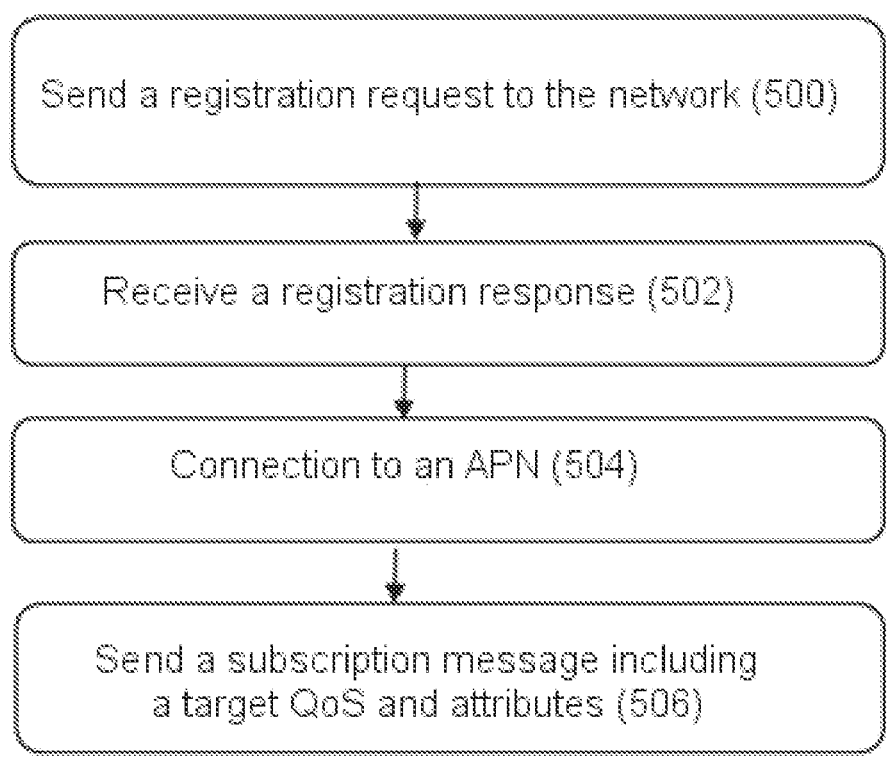
FIG. 5 is a flowchart showing the subscription method, according to one embodiment.

FIG. 5 is a flowchart representing the registration and subscription method (step 400 of FIG. 4), according to one embodiment. The registration and subscription method can be implemented by the block 21 of the connection unit 2001.

In step 500, a registration request is sent to the V2X communication service corresponding to the V2X application that can comprise registration attributes.

The registration attributes included in the registration request can include, for example:
- a list of types of messages supported by the communication management device 20; and/or
- the version of the V2X communication protocol supported by the communication management device 20; and/or
- the communication protocol supported by the communication management device 200 for the subscription to the V2X service (for example, http, MQTT, etc.) and for the data plan (for example, UDP/IP, TCP/IP, MQTT, etc.).

In step 502, a registration response is relayed back to the communication management device 200, which response can include an identifier and a list of usable RATs.

In step 504, if the registration response confirms the registration of the vehicle 2, the communication device 20 can optionally connect to the offboard service via a dedicated APN ('Access Point Name') or via a dedicated network slice.

In step 506, the subscription is completed on the new created connectivity (in the case of a dedicated APN or a dedicated network slice). This step involves the network core 5 assigning a default QoS level to the default V2X line ('bearer'). A subscription message then can be sent via the cellular network to the application server 6 so that it completes the subscription.

The subscription request can include the following subscription information:
- Region of Interest information (ROI) representing the target zone to be detected for implementing the V2X service corresponding to the V2X application executed by the vehicle 2. The Region of Interest information can comprise Region of Interest descriptors; and/or
- types of information required by the vehicle (for example, object, event, map, etc.); and/or
- attributes, with one or more attributes being associated with a type of information required by the vehicle 2 (examples of attributes for the 'object' type of information can be 'truck' or 'car', an example of an attribute for the 'event' type of information can be 'weather' or 'accident'; an example of an attribute for the 'map' type of information can be 'district'); and/or
- information relating to the required Quality of Service level comprising the target Quality of Service $QoS^{target}$ required by the V2X application and used by the communication management device 20. The target Quality of Service $QoS^{target}$ can be defined by an n-tuple comprising n target values defined for n Performance Indicators $KPI_j^{target}$: $QoS^{target} = (KPI_1^{target}, \ldots, KPI_j^{target}, \ldots, KPI_n^{target})$.

In one embodiment, the subscription request can comprise the following attributes:
- the type of message information; and/or
- a set of causes (representing conditions for triggering the sending of a message), each cause comprising a set of sub-causes, each cause being associated with a cause identifier, each sub-cause being associated with a sub-cause identifier and with a set of cause attributes, denoting the information relevant to the vehicle 2.

For example, the set of causes can include:
Cause 1
  Sub_cause 1.a, attributes {1.a.1, 1.a.2, 1.a.3 . . . }
  Sub_cause 1.b, attributes {1.b.1, 1.b.2, 1.b.3 . . . }
Cause 2
  Sub_cause 2.a, attributes {2.a.1, 2.a.2, 2.a.3 . . . }
  Sub_cause 2.b, attributes {2.b.2, 2.b.2, 2.b.3 . . . }

An example of a type of message specified in the subscription request can be 'DENM', for example.

Examples of causes can be DangerousLocation-ObstacleOnTheRoad, SlowVehicle, BrokenDownVehicle, PostAccident, HumanProblem, StationaryVehicle, CollisionRisk, DangerousSituation, as defined in the ETSI 302.637 specifications.

Examples of cause attributes can include, by way of a non-limiting example:
- a minimum event confidence level;
- a report mode (from the geoservice to the vehicle 2);
- a minimum confidence level on the position of the event;
- a maximum event age defined in relation to the time of detection of the event.

In embodiments, the offboard application server on the network 6 can be configured to predict (i.e. estimate) the Quality of Service over a future time period, the Quality of Service information specified in the subscription request can also include a nominal Quality of Service $QoS^{nominal}$ and/or Quality of Service conditions. The Quality of Service conditions can be formulated in the form of a range of target Quality of Service values representing the acceptable range of QoS values for a degraded mode over a time period (for example, acceptable target QoS interval or lower Quality of Service threshold $QoS^{min}$, representing the lower acceptable QoS value for the degraded mode).

The target Quality of Service $QoS^{target}$ can be represented by M performance indicators, for example, in the form of a Quality of Service descriptor. The M performance indicators can include one or more performance indicators (KPIs), such as the target latency and/or the rate of target packet error.

The QoS information specified in the subscription request (QoS required by the vehicle 2) can be represented by QoS descriptors, these QoS descriptors can comprise other information relating to the QoS, such as:
- information indicating whether the target QoS must or must not be guaranteed; and/or
- the maximum flow over the uplink and/or over the downlink if the target QoS must be guaranteed; and/or
- a notification mode.

The Region of Interest ROI information indicated in the subscription request can be described in several ways in the subscription information.

In one embodiment, the Region of Interest ROI can be relatively described in relation to the position of the vehicle 2 (quantified). The relative description of the region of interest then can be in the form of a set of tiles arranged around a square in which the vehicle 2 is located.

Thus, as a function of the size of the square, the updating rate of the information can be limited and the update can only contain the changes of its square or changes due to new relevant squares, for example, due to a change of environment (for example, transition from an urban environment to a motorway environment). However, depending on the size and the format of the squares, the region of interest may not exactly correspond to the relevant region of the vehicle 2.

As an alternative embodiment, the description of the region of interest can be based on a standardized form in relation to a barycenter, such as, for example, an ellipse (defined by its large axis and its small axis), a circle (defined by its center and its radius), a rectangle (defined by its length and its width). The information of the barycenter can be regularly updated to inform the geoserver. Such a description of the region of interest is advantageously adapted to the zone of proximity of the vehicle 2, with the zone of proximity being determined by the vehicle application as a function of a set of parameters, such as the speed, the road characteristics, etc. However, an updating rate of the barycenter can be required, with the updating rate being able to be enhanced with limited information to be exchanged.

In another alternative embodiment, an absolute description of the region of interest can be used. The absolute description is defined in an absolute reference frame. The absolute description can be represented from vectors and/or polygons and/or tiles, which allows a description to be obtained that is adapted to the zone of proximity of the vehicle 2.

In one embodiment, the subscription can be completed using a notification method. According to this notification method, the offboard application server 6 can either periodically send information that corresponds to the required subscription conditions or can be configured to detect a change of information that corresponds to the subscription conditions required since the last notification.

In one embodiment, the connection unit 2001 (after step 510 of FIG. 5) can provide, as output, a list of ports of the V2X registered services, with a port being able to be matched (mapped) with a single V2X service or a plurality of V2X services. A same Quality of Service QoS level can be applied to the various links created during the subscription.

Figure 6:
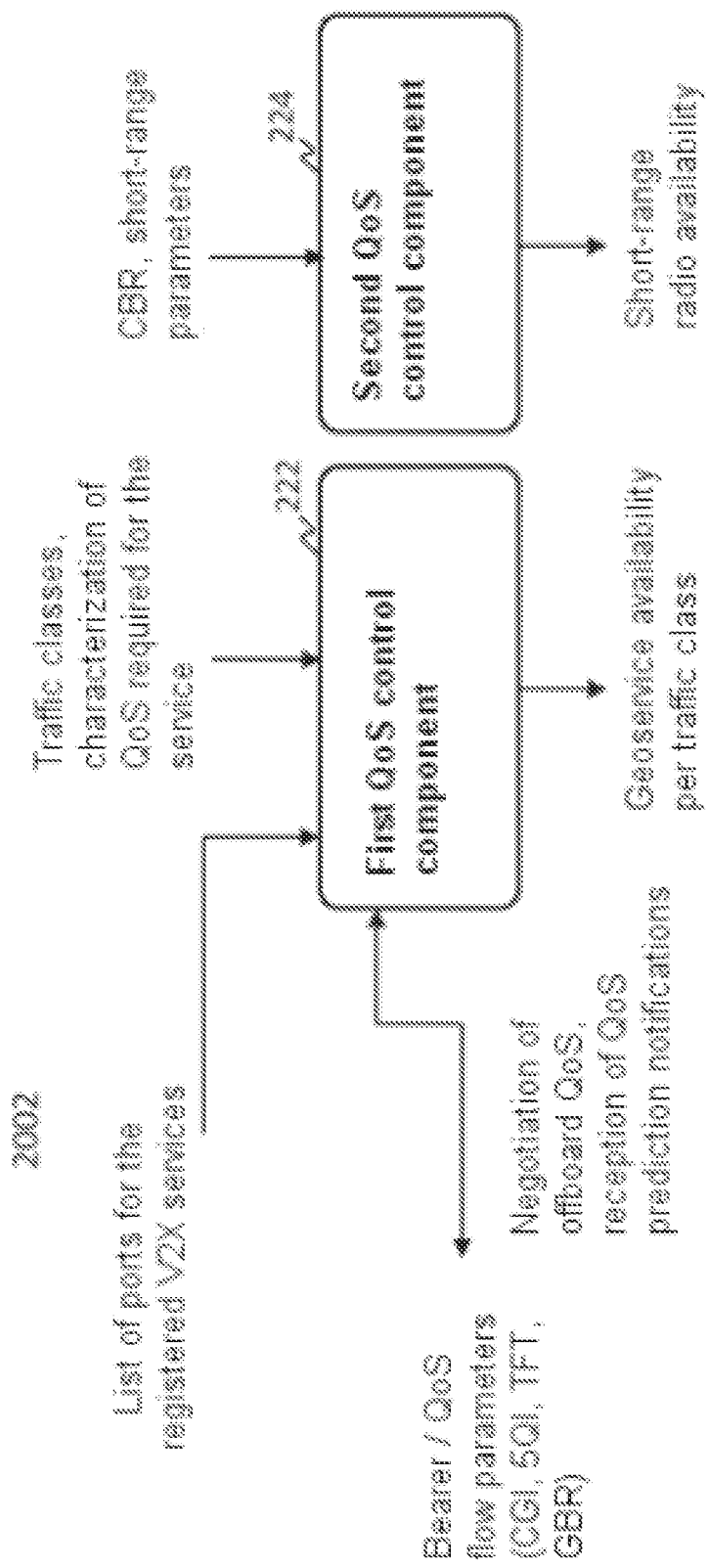
FIG. 6 is a diagram showing the Quality of Service control unit, according to one embodiment.

As illustrated in FIG. 6, the QoS control module 2002 is responsible for controlling the QoS of all the communication links in order to determine the available RATs. The Quality of Service control module 2002 can comprise:
- a first control component 222 configured to control the QoS for the cellular connectivity on the interface Uu (cellular network 1) and for the V2X services provided by the application server 6;
- a second control component 224 for controlling the QoS of the other short-range RATs.

In one embodiment, the first control component 222 can control the QoS for the connectivity with the interface Uu on the basis of functions that can be available on the cellular network 1 (for example, 4G or 5G). The first control component 222 can use data determined by bearer allocation, notification and QoS prediction functions implemented by the cellular network 1. In one embodiment of the invention, at least some of these functions can be implemented in the offboard application server 6. Alternatively, some of these functions at least can be controlled by the communication management device 2.

In some embodiments, the application server 6 can implement the bearer allocation and Quality of Service control function, whereas the network core 5 (for example, LTE/5G core) implements the Quality of Service prediction function. In such an embodiment, the application server 6 can use the Quality of Service prediction completed by the prediction function (implemented, for example, by the network core 5) in order to obtain prediction information relating to the Quality of Service levels that are possible in the Region of Interest specified for the specified V2X services.

Figure 7:
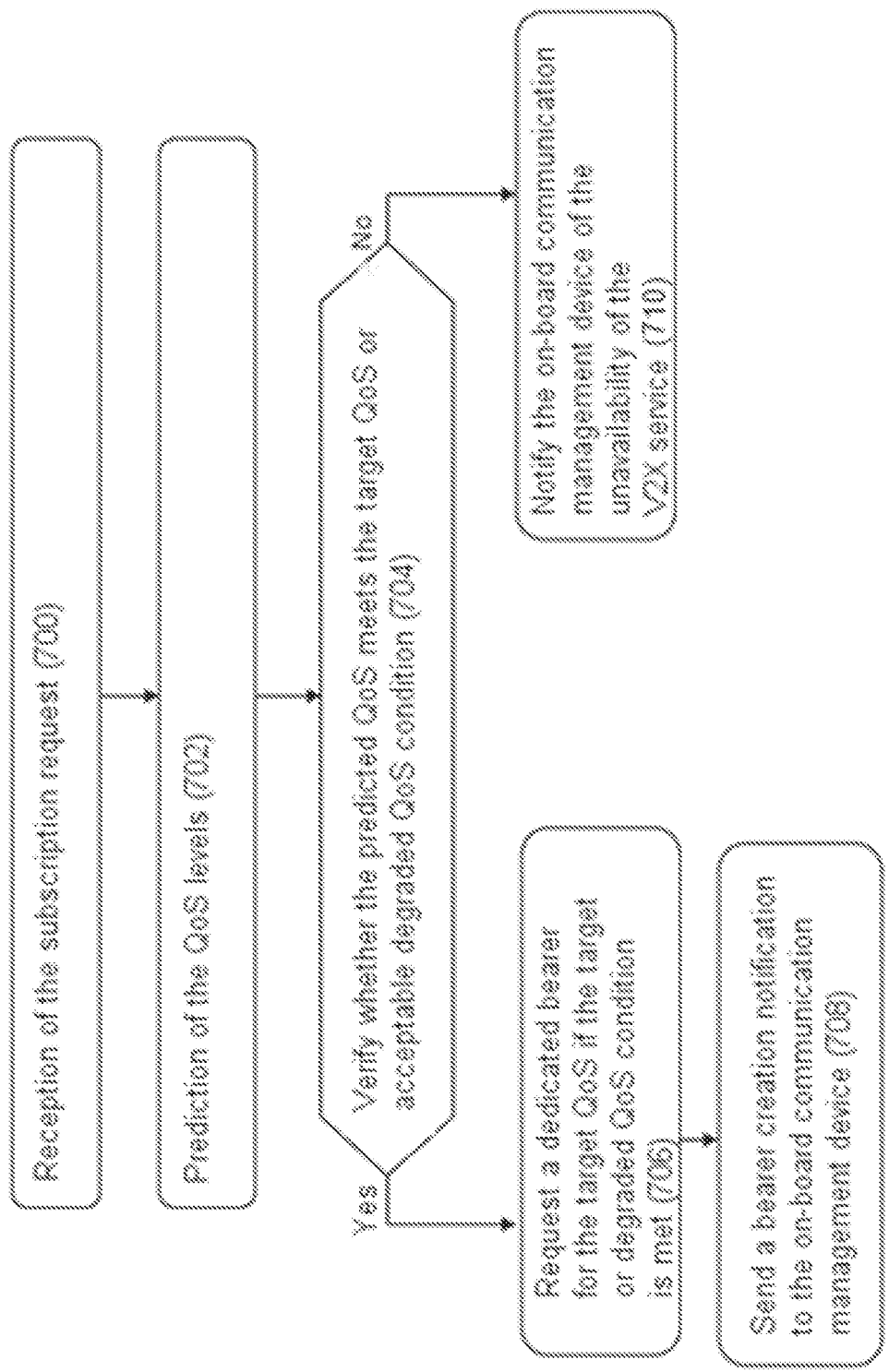
FIG. 7 is a flowchart showing the method for processing a subscription request, according to one embodiment.

FIG. 7 shows the QoS prediction and QoS allocation method, according to some embodiments. In one embodiment, the QoS prediction and QoS allocation method can be implemented by one or more cellular network elements.

In response to the reception of a subscription request specifying a target Quality of Service $QoS^{target}$ (step 700), the list of a priori predicted Quality of Service levels (or estimated over a future time period) is determined, in step 702, for at least one of the Quality of Service information items specified in the subscription request (for example, target QoS, nominal QoS, etc.). The prediction step can be carried out by the network core 5, for example. In one embodiment, the prediction step can initially determine a prediction for the target Quality of Service.

In step 708, a dedicated connection ("bearer") is requested for the target QoS specified in the subscription request (for example, by the application server 6 or by the geoservice), if the default connection does not meet the target QoS (the predicted QoS is equal to the target QoS). As used herein, the term "bearer" refers to a medium or 'line' that is used to convey the information associated with a V2X service (condition tested in step 704). The bearer can be a new dedicated radio bearer (for example, in an LTE cellular network) or a traffic flow (in a 5G cellular network). For example, the bearer can be opened using an API ("Application Programming Interface") programming interface, such as API MEC ("Mobile Edge Computing").

In step 708, the communication management device 20 is notified of the creation of the bearer, with the notification including information relating to the QoS class identifier (QCI). The notification can be completed, for example, by using secure notification messages such as NAS ("Non-Access Stratum") messages and an AT command (AT is the abbreviation for "ATtention") between the core network 5 and the piece of mobile vehicle equipment 2.

In step 704, if the predicted or allocated QoS is different from the target Quality of Service $QoS^{target}$, it is also possible to verify (for example, by the geoservice) whether the predicted QoS level is within an acceptable degraded QoS range of values, if such a QoS range is specified in the subscription request (the range can be defined by an interval of QoS values or by a QoS threshold). If the range of QoS values condition is met (i.e. the predicted QoS is within the specified range of QoS values), a request can be sent (for example, by the application server 6) to the network core 5 in order to request the opening of a dedicated bearer, according to steps 706 and 708 for the degraded predicted QoS (as used herein, the term "degraded" refers to a predicted QoS that does not meet the target QoS but that is within the acceptable range of QoS values specified in the subscription request).

Otherwise, in step 710, if the predicted QoS is below a predefined QoS threshold, a notification can be sent by one of the offboard components (application server 6) to the on-board communication management device 200 in order to notify of the unavailability of the service.

In other embodiments, the prediction function may not be implemented or used or be able to be used by the system, for example, if the application server 6 hosting the geoservice does not support a prediction function or if the network core cannot predict the Quality of Service of a particular V2X service in a given zone. Similarly, V2X services can be rendered unavailable in response to the detection of certain events (for example, a security attack), or on a given geographical zone or over a given time period. In such situations, the application server 6 can request the creation, with the network core 5, of a dedicated connection and can negotiate QoS parameters until a QoS meeting the QoS conditions specified in the subscription request (target QoS and optionally range of QoS values) is found. The application server 6 will then consider that the negotiated QoS is valid until the cellular network indicates a change of QoS.

In one embodiment, an allocation and a control of the Quality of Service can be directly implemented in the vehicle 2 (on-board side) by the communication management device 200 (at least partly by the QoS control module 2002). The communication management device 200 then can be configured to determine the availability or the unavailability of the cellular RAT for the considered V2X service on the basis of the QoS prediction information received from the prediction function, for example, in the form of a notification or of notifications.

In such an embodiment, the communication management device 200 can be configured to request the opening of a dedicated connection with a Quality of Service identified by a QoS identifier (for example, QCI for 4G or 5QI) if the default connection does not meet the QoS conditions specified in the subscription request (the QoS conditions specified in the subscription request, for example, in the form of QoS descriptors, can be stored in a local database).

Furthermore, the communication management device 200 can request QoS prediction information (for example, in the form of notifications) in a given geographical zone, for example, as a function of the route planned by the vehicle 2. In one embodiment, the communication management device 200 can communicate with the prediction function using signaling messages, for example, of the NAS type. The on-board communication management device 200 can then communicate with the QoS prediction function hosted in the cellular network 1 and can request QoS prediction information in different manners.

In a first embodiment, the communication management device 200 can request the QoS prediction information at a given instant, by providing information relating to the Region of Interest in the form of descriptors of the Region of Interest, for example, and by receiving the predicted QoS prediction function in response.

In an alternative embodiment of the first embodiment, the communication management device 200 can receive a predicted QoS periodically or in response to the detection of events. To this end, the communication management device 200 can:
  provide information relating to a set of thresholds;
  provide information on the Region of Interest periodically updated and representing the zones in which the Quality of Service a priori must be predicted;
  receive a notification in response to the detection of a predicted QoS that is lower than one of the thresholds of the set of thresholds; conversely, no notification is sent when the predicted QoS is greater than or equal to all the thresholds.

In a second embodiment, the on-board communication management device 200 can use signaling messages via the user plan. In this embodiment, the QoS information can be requested by the communication management device 200 from a service located in the application server 6 in which the geoserver is registered. The geoserver can subsequently establish communication with the prediction function located in the cellular network (for example, in the network core 5) in order to obtain the QoS prediction information, as described in the first embodiment.

As a function of the tested QoS conditions (comparison of the target QoS with the predicted QoS), the communication management device 200 can associate an availability indicator with the connectivity of the interface Uu for a given V2X service, with the indicator being able to assume a first value if the connectivity is available for a given V2X service or a second value for indicating the unavailability of the connectivity of the interface Uu for the considered V2X service, if the predicted QoS does not meet the QoS conditions specified by the vehicle 2 (for example, by means of the QoS descriptors in the subscription request).

In the case whereby the cellular network 1 cannot predict the QoS for a particular V2X service in a Region of Interest, the communication management device 200 can request that the cellular network creates a dedicated connection for conveying information relating to the V2X service and can negotiate reference QoS parameters meeting the target QoS conditions specified in the subscription request. The communication management device 200 of the vehicle 2 will then consider the reference QoS to be valid until it is notified of a change by the cellular network.

In the various embodiments where the QoS can be predicted by the prediction function, the prediction QoS is associated with an estimated time period representing the time period during which the prediction was undertaken (time window of the validity of the predicted QoS).

The communication management device 200 can further comprise a notification unit configured to send information to one or more components of the communication management device 200 in order to notify of the availability/unavailability of the cellular connection for the V2X service (connectivity Uu available/unavailable for the V2X service). With the QoS prediction information being provided in advance, this allows the communication management device 200 (or more generally the vehicle 2) to adapt to the case of the unavailability of a V2X service.

In one embodiment, the RATs selector 2004 (shown in FIG. 2) can be configured to take into account packet transmission criteria in accordance with a long-term transmission strategy for the considered V2X service. The transmission criteria can include one or more of the following criteria:

- the availability information of the interface Uu for the V2X service that can be received from the service availability estimation unit, as well as the time window corresponding to this availability information (duration during which the connectivity link is available or unavailable, as appropriate);
- information received from data providers or from data consumers, such as information indicating whether an additional link is required that would require redundant information.

A table of correspondence can be used by the RATs selector 2004, with the table of correspondence associating a given type of service with a set of parameters relating to the V2X service. The parameters relating to a given type of V2X service can include one or more of the following parameters: the system requesting the service, the system providing the service, the type of message, the packet category (or 'traffic class'), the set of RATs that can be used for the service, and port information comprising, for each usable RAT, the one or more associated transmission ports.

An example of a table of correspondence is provided by table T1:

TABLE 1

| Type of service | Requestor system | Provider system | Type of message | Traffic class for the transmission | Matching of ports for the transmission |
|---|---|---|---|---|---|
| Emergency electronic cut-off link . . . | ID system A (ADAS), ID system B, etc. | ID system A (ADAS), ID system C (CAN) | DENM | ID of traffic class (PPPP1) | {Uu {port N}, 11p, PC5} |

The transmission manager 2005 can rely on the table of correspondence. The transmission manager 2005 can be configured to analyze the content of the message to be transmitted or the system providing said data in order to determine through which RAT such data must pass.

Figure 8:
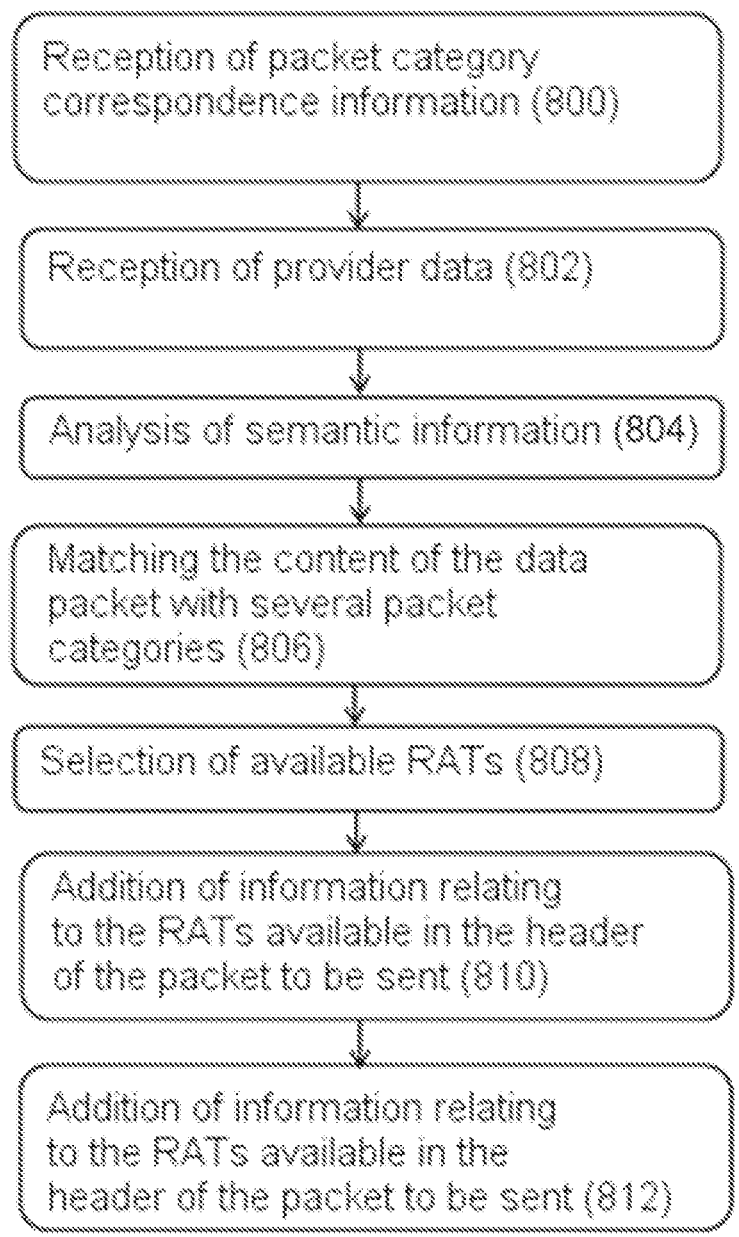
FIG. 8 is a flowchart showing the method for matching a category of a data packet to be sent, according to one embodiment.

FIG. 8 is a flowchart representing the method implemented by the transmission manager 2005.

In step 800, information for matching packet categories is received, the matching information can comprise at least some of the following information:

- a semi-static table of correspondence that associates RATs with categories of packets, with this table being able to be used by the RAT selector 2004 in order to filter the RATs of the availability vector V as a function of the long-term transmission strategy;
- a list of the transmission ports available for connecting with the cellular network 1 (for example, Uu connection for an LTE network) or information relating to the network slices (connection on a virtual part of the network for a 5G cellular network), as well as connections and their port features (for example, GBR, QCI/5QI, or TFT).

In step 802, data can be received from the data provider corresponding to the packet to be sent from the vehicle 2 to the receiver devices 3 located in the vicinity. The provider data can be received in a format adapted to the transmission of the data packet (for example, standardized format).

In step 804, the semantic information included in the data packet can be analyzed.

In step 806, the content of the data packet can be matched (mapped) with one or more categories of packets (traffic classes) that define the target QoS for the V2X service, with the retained category being indexed by "i".

In step 808, on the basis of the filtered availability vector Vi that stores the availability information for a sub-set of the RATs and for the retained category, the RATs identified as available in the vector Vi are selected for transmitting the data packet.

In step 810, the information relating to the selected RATs is added to the data packet that is to be transmitted to the receiver devices 3, for example, in the header of the packet.

In one embodiment, the information added to the packet can include:

- a binary data structure of available RATs, such as a binary vector (bitmap) indicating, for each message, the list of available RATs that can be selected; the binary data structure can include a number of components that is at least equal to the number of available RATs (i.e. the number of RATs associated with a value 1 in the vector Vi, for example, if the value 1 represents the availability of an RAT). The data structure of available RATs can include, for example, 4 components $[n_0, n_1, n_2, n_3]$, where $n_0$ corresponds to the RAT LTE (Uu), $n_1$ corresponds to the RAT 5G (gU), $n_2$ corresponds to the RAT 802.11p and $n_3$ corresponds to the RAT C-V2X (PC5).

In one embodiment, the data structure of available RATs can also comprise port information indicating the transmission ports through which the information must be routed.

Figure 9:
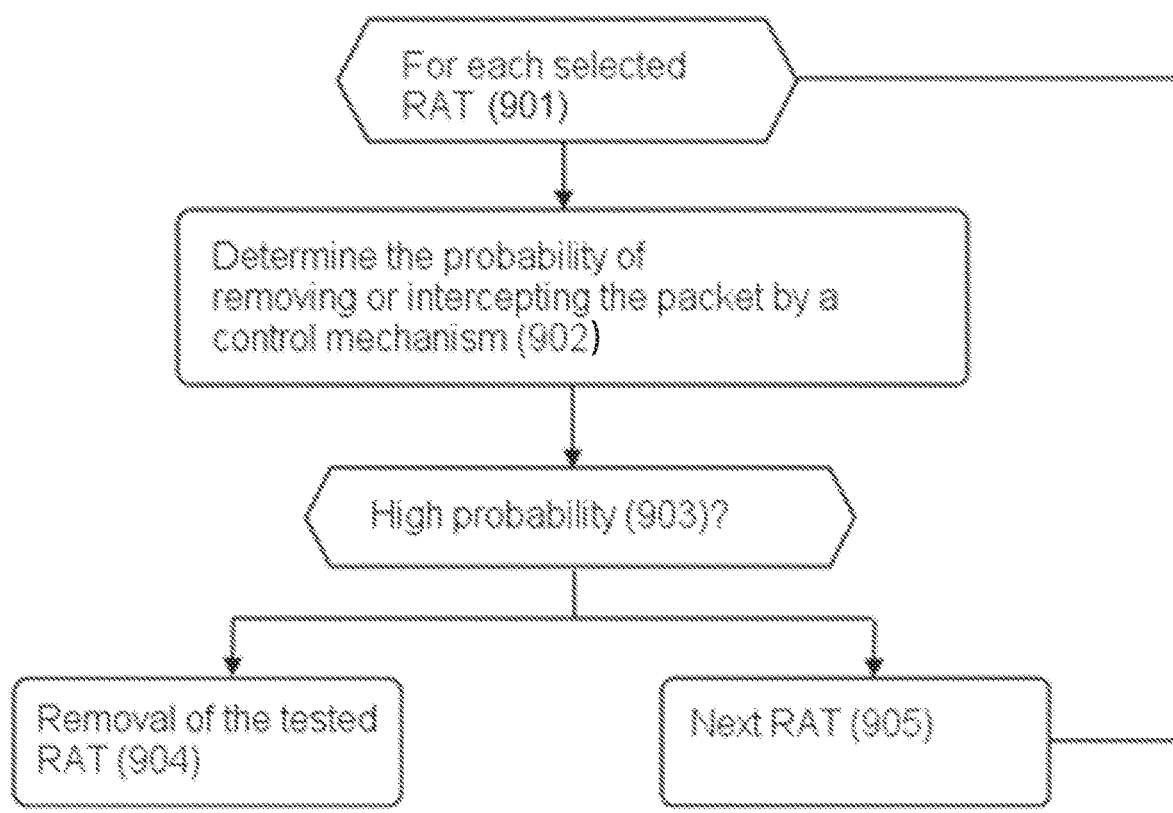
FIG. 9 is a flowchart showing the method for selecting RATs for transmission, according to one embodiment.

FIG. 9 is a flowchart representing the method for selecting RATs, according to some embodiments. The method for selecting RATs can be implemented by the transmission manager 2005 in order to dynamically apply the selection of RATs identified in the RATs availability data structure, using routing rules for each packet to be transmitted.

In one embodiment, the RAT selection method can be implemented on the facility layer. In such an embodiment, the facility layer can be independent of the RAT that is used and separate protocol stack layers that are dependent on the RAT can be used.

As an alternative embodiment, the method for selecting RATs can be implemented under the geonetwork layer.

The method for selecting RATs can comprise a preliminary step, in which a verification is undertaken with respect to whether the data packet to be transmitted over one or more RATs meets predefined transmission rules.

In step 902, for each RAT (block 901) of the set of RATs indicated as being available in the availability data structure (if the set comprises a plurality of RATs), the probability of removing or intercepting the data packet by a congestion control or flow control mechanism is subsequently determined. As used herein, the notion of 'data packet interception' refers to a method involving separating a data packet.

Such a probability of removal or of interception enables an assessment to be made of the risk of the packet not being transmitted.

If the probability of removal or of interception of this packet is determined to be high (step 903), the tested RAT can be removed, in step 904, from the available candidate RATs, identified in the RATs availability data structure.

For example, in step 902, for a RAT Uu indicated as being available for transmitting the data packet, it is possible to verify whether the data packet has been matched with a GBR bearer (using the selection information received by the selection method). If such a condition is verified for the RAT LTE, the bit rate of the GBR bearer can be computed. If the bit rate of the GBR bearer is greater than the maximum negotiated bit rate, there is a risk of the packet being removed in a 4G or 5G network. The RAT Uu then can be removed in step 904 from the available candidate RATs identified in the RATs availability data structure.

When all the RATs have been processed in step 902 (block 906), the data packet subsequently can be routed, in step 908, on the remaining available RATs (not removed in step 904).

Advantageously, the method for selecting RATs allows the optimal RATs to be selected for each V2X message (data packet) to be transmitted, such that the effective connectivity performance capabilities meet the required performance capabilities (represented by the target QoS specified by the vehicle 2 in the subscription request).

The vehicle 2 thus can configure the geoservice so that the V2X information of the data packet is transmitted without the vehicle 2 having communicated its position. Thus, the confidentiality of the private data of the user of the vehicle 2 can be preserved.

The invention can be used for any V2X application involving a transmission of a data packet from a vehicle 2 to at least one receiver device 3 (another vehicle, RSU, smart phone, etc.) located in a zone of proximity, irrespective of the environment of the vehicle.

A person skilled in the art will understand that the system or the sub-systems according to the embodiments of the invention can be implemented in various manners by hardware, software, or a combination of hardware and of software, in particular in the form of program code that can be distributed in the form of a program product in various forms. In particular, the program code can be distributed using computer readable media, which can include computer readable storage media and communication media. The methods described in the present description particularly can be implemented in the form of computer program instructions that can be executed by one or more processors in a computer information device. These computer program instructions also can be stored in a computer readable medium.

Moreover, the invention is not limited to the embodiments described above by way of a non-limiting example. It encapsulates all the alternative embodiments that can be contemplated by a person skilled in the art. In particular, a person skilled in the art will understand that the invention is not limited to the performance indicators mentioned in the above description, and can include other types of performance indicators.

APPENDIX A1

The definition of the list of acronyms used in the description is provided below:
V2X: Abbreviation for 'Vehicle to Everything'.
V2V: Abbreviation for 'Vehicle to Vehicle'.
V2I: Abbreviation for 'Vehicle to Infrastructure'.
V2N: Abbreviation for 'Vehicle to Network'.
V2N2V: Abbreviation for indicating an indirect V2V communication, via a network.
V2P: Abbreviation for 'Vehicle to Pedestrian'.
ETSI: Acronym for 'European Telecommunication Standard Institute'.
ITS-G5: Acronym for 'Intelligent Transport System—G5'.
CAM: Acronym for 'Co-operative Awareness Messages'.
DENM: Acronym for 'Decentralized Environmental Notification Messages'.
CPM: Acronym for 'Collective Perception Message'.
MCM: Acronym for 'Maneuver Coordination Message'.
3GPP: $3^{rd}$ Generation Partnership Project.
LTE: Acronym for 'Long Term Evolution'.
5G: $5^{th}$ Generation.
702.11p: Wi-Fi based technology.
5GAA: Acronym for '5G Automotive Association'.
Uu: Radio access interface used in LTE or 5G for communicating between a user and the base station serving them.
MNO: Acronym for 'Mobile Network Operator'.
MEC: Acronym for 'Mobile Edge Computing'.
eNB/gNB: Base station for LTE and 5G respectively.
C-ACC: Cooperative—Adaptive Cruise Control.
RAT: Radio Access Technology.
PC5: Radio access interface used when two users communicate directly without using the cellular network infrastructure (for V2V).
KPI: Key Performance Indicator.
QoS: Quality of Service.
UDP/TCP/IP: Standard network and transport protocol for LTE/5G.
MQTT: Acronym for 'Message Queuing Telemetry Transport'.
APN: Acronym for 'Access Point Name'.
VPN: Acronym for 'Virtual Private Network'.
ADASIS: Acronym for 'Advanced Driver Assistance Systems Interface Specifications'.
API: Acronym for 'Application Programming Interface'.
QCI: Acronym for 'QoS Class Identifier'.
5QI: Acronym for '5G QoS Class Identifier'.
NAS: Acronym for 'Non Access Stratum'.
AT command: (AT is derived from ATtention) Type of signal used to send specific commands.
QPF: Quality of Service Prediction function.
PPPP: Priority level.
CAN: Acronym for 'Controller Area Network'.
TFT: Acronym for 'Traffic Flow Template'.
GBR: Acronym for 'Guaranteed Bit Rate'.

The invention claimed is:
1. A piece of mobile vehicle equipment comprising:
a V2X communication management device connected to a cellular communication network, the communication management device comprising a Radio Access Technology selection unit configured to determine, in response to a detection of at least one triggering condition for sending a V2X data packet associated with a V2X application executed by the piece of mobile vehicle equipment, at least one Radio Access Technol- ogy (RAT) available to be used for transmitting said data packet to at least one receiver device, the selection unit being configured to select at least one Radio Access Technology that is available from a set of Radio Access Technologies, as a function of target Quality of Service information defined by the V2X application and comprising an n-tuple of performance indicators, said n-tuple of performance indicators comprising at least one performance indicator and being determined from a set of performance indicators selected as a function of the V2X application, the V2X communication management device being configured to send the V2X data packet to at least one receiving device using the selected Radio Access Technology, wherein the communication management device comprises a connection unit configured to establish an initial connection with an application server delivering a V2X service associated with the V2X application, via the cellular communication network, the connection unit being configured to send a request to subscribe to the V2X application to said application server, the subscription request identifying said V2X service and comprising Quality of Service information required by the piece of mobile vehicle equipment, said Quality of Service information comprising the target Quality of Service, wherein the communication management device is configured to request, from a prediction function, the Quality of Service information in a given geographical zone as a function of a route planned by the mobile vehicle, the communication management device being configured to communicate with the prediction function using signaling messages in order to retrieve the Quality of Service information in the given geographical zone, and the prediction function is hosted in the cellular communication network, wherein, when the cellular communication network cannot predict the Quality of Service information in the given geographical zone in response to the request from the communication management device, the communication management device requests that the cellular communication network creates a dedicated connection for conveying information relating to the V2X service and negotiates said performance indicators in the subscription request, and the communication management device considers the Quality of Service information in the given geographical zone to be valid until the cellular communication network notifies the communication management device of a change.

2. The piece of mobile vehicle equipment as claimed in claim 1, wherein said performance indicators of said set of performance indicators are selected from a group comprising at least one latency parameter, one reliability parameter, one availability parameter, one data flow parameter and one information age parameter.

3. The piece of mobile vehicle equipment as claimed in claim 1, wherein the piece of mobile vehicle equipment is configured to receive a notification of the opening of a bearer for conveying information between the application server and the piece of mobile vehicle equipment when a Quality of Service estimated over a future time period meets one or more conditions relating to the Quality of Service information.

4. The piece of mobile vehicle equipment as claimed in claim 1, wherein said Quality of Service information further comprises an acceptable degraded range of Quality of Service values.

5. The piece of mobile vehicle equipment as claimed in claim 1, wherein the subscription request further comprises a description of a region of interest associated with the V2X application, said description being a relative description relative to the position of the piece of vehicle equipment or an absolute description defined in an absolute reference frame.

6. The piece of mobile vehicle equipment as claimed in claim 5, wherein the absolute description is represented in said absolute reference frame on the basis of vectors and/or of polygons and/or of tiles.

7. The piece of mobile vehicle equipment as claimed in claim 1, wherein said subscription request further comprises types of information and attributes, with each attribute being associated with a given type of information.

8. The piece of mobile vehicle equipment as claimed in claim 1, wherein the communication management device comprises a unit for estimating V2X service availability, said unit for estimating service availability being configured to estimate the availability of a V2X service on the basis of information for predicting the Quality of Service QoS.

9. The piece of mobile vehicle equipment as claimed in claim 1, further comprising a unit for determining availability that is configured to compute a vector of availability of RATs, on the basis of the comparison between the target Quality of Service and a Quality of Service predicted over a future time window, said availability vector comprising a set of components having a binary value, each component being associated with an RAT that can be used to transmit the data packet from the piece of mobile vehicle equipment, the binary value indicating the availability or the unavailability of the RAT.

10. The piece of mobile vehicle equipment as claimed in claim 9, further comprising an RAT selector that is configured to select at least one RAT from among the RATs of the vector of availability of RATs as a function of a set of transmission criteria.

11. The piece of mobile vehicle equipment as claimed in claim 10, wherein said criteria comprise a criterion relating to a redundancy parameter and/or a V2X cost of service parameter and/or a message priority parameter and/or a V2X service parameter.

12. A V2X communication system, comprising:
at least one of the piece of mobile vehicle equipment as claimed in claim 1;
a cellular communication network; and
an application server delivering the V2X service associated with the V2X application,
wherein the system comprises a prediction function configured to predict the Quality of Service on the basis of the target Quality of Service information.

13. The piece of mobile vehicle equipment as claimed in claim 1, wherein said performance indicators of said set of performance indicators at least one latency parameter, at least one reliability parameter, an availability parameter, a data flow parameter, and an information age parameter.

14. The piece of mobile vehicle equipment as claimed in claim 1, wherein, when the cellular communication network can predict the Quality of Service information in the given geographical zone, the prediction includes a time window of validity of the predicted Quality of Service information.

15. A method for V2X communication management implemented in mobile vehicular equipment in response to a detection of at least one triggering condition for sending a V2X data packet associated with a V2X application executed by the mobile vehicular equipment, the method comprising:

selecting at least one Radio Access Technology that is available to be used for transmitting said data packet, on the basis of a set of Radio Access Technologies, as a function of target Quality of Service information defined by the V2X application, the Quality of Service information comprising an n-tuple of performance indicators, said n-tuple of performance indicators comprising at least one performance indicator and being determined from a set of performance indicators selected as a function of the V2X application; and sending the V2X data packet to at least one receiving device using the selected Radio Access Technology, wherein the selecting includes establishing an initial connection with an application server delivering a V2X service associated with the V2X application, via a cellular communication network, by sending a request to subscribe to the V2X application to said application server, the subscription request identifying said V2X service and comprising Quality of Service information required by the piece of mobile vehicle equipment, said Quality of Service information comprising the target Quality of Service, wherein the method further comprises the communication management device requesting, from a prediction function, the Quality of Service information in a given geographical zone as a function of a route planned by the mobile vehicle, the communication management device communicating with the prediction function using signaling messages in order to retrieve the Quality of Service information in the given geographical zone, and the prediction function is hosted in the cellular communication network, and wherein, when the cellular communication network cannot predict the Quality of Service information in the given geographical zone in response to the request from the communication management device, the communication management device requests that the cellular communication network creates a dedicated connection for conveying information relating to the V2X service and negotiates said performance indicators in the subscription request, and the communication management device considers the Quality of Service information in the given geographical zone to be valid until the cellular communication network notifies the communication management device of a change.

16. The method as claimed in claim 15, wherein said performance indicators of said set of performance indicators at least one latency parameter, at least one reliability parameter, an availability parameter, a data flow parameter, and an information age parameter.

17. The method as claimed in claim 15, wherein, when the cellular communication network can predict the Quality of Service information in the given geographical zone, the prediction includes a time window of validity of the predicted Quality of Service information.

\* \* \* \* \*